June 21, 1949.　　　D. F. ALDRICH　　　2,473,838
REGULATING SYSTEM
Filed March 24, 1948

WITNESSES:

INVENTOR
Donald F. Aldrich.
BY
ATTORNEY

Patented June 21, 1949

2,473,838

UNITED STATES PATENT OFFICE 2,473,838

REGULATING SYSTEM

Donald F. Aldrich, Pittsburgh, Pa., assignor to Westinghouse Electric Corporation, East Pittsburgh, Pa., a corporation of Pennsylvania Application March 24, 1948, Serial No. 16,799

10 Claims. (Cl. 318—307)

1

This invention relates to regulating systems and in particular to wide range regulating systems.

In the wide range regulating systems employed heretofore, considerable difficulty has been experienced in producing systems which maintain good accuracy at both high and low values of the characteristic which is to be regulated. For example, in regulating for speed or for voltage, it is found that the relative effect of load current voltage drops requires or necessitates a higher gain at the lower value of the characteristic to be regulated than at the higher value of the characteristic such as speed or voltage.

Attempts have been made to compensate for such decrease in system accuracy at the low values of the characteristic by increasing the regulating systems amplification. However, high amplification produces system instability with the result that unless complicated stabilizing circuits are employed, it is found to be impossible to obtain good regulation at the low values of the characteristic and stable operation at the high values of the characteristic.

An object of this invention is to produce a wide range regulating system having a variable gain voltage amplifier for giving a high system gain at the low values of the characteristic to be regulated and an appropriately lower gain at the high values of the characteristic.

Figure 1:
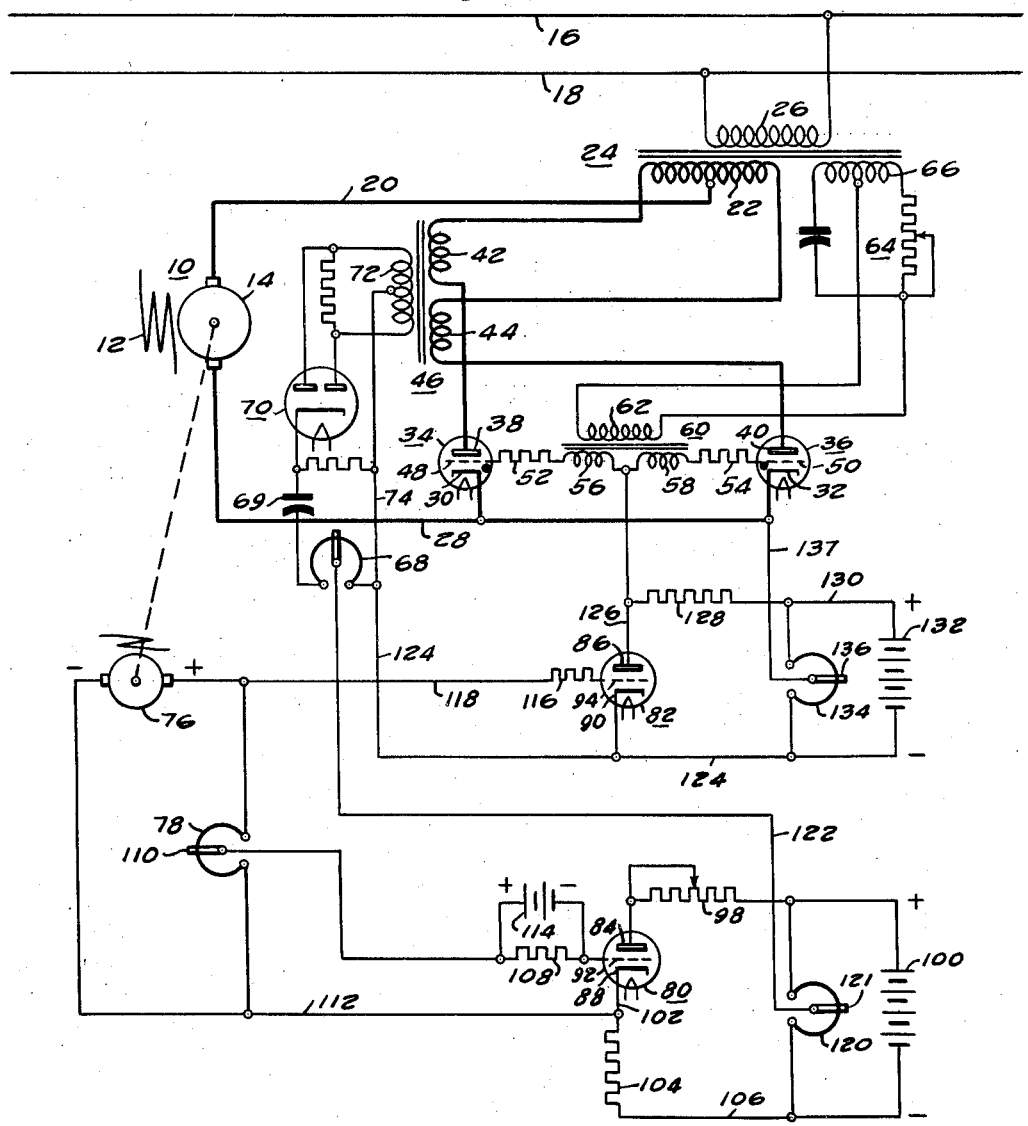
Figure 2:
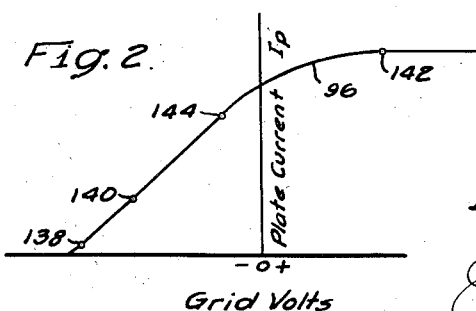

Other objects of this invention will become apparent from the following description when taken in conjunction with the accompanying drawing, in which:

Figure 1 is a diagrammatic view of circuits and apparatus constituting an embodiment of the invention; and Fig. 2 is a graph, the curve of which illustrates the characteristic curve of the plate current for changes in the grid voltage for certain vacuum amplifying valves employed in the system of Fig. 1.

Referring to Fig. 1 of the drawing, this invention is illustrated by reference to a motor 10, the speed of which is to be regulated. The motor 10 is of usual construction being provided with a field winding 12 which is suitably supplied from a source (not shown) and an armature winding 14 connected to be supplied from line conductors 16 and 18.

As illustrated, one terminal of the armature winding 14 is connected by conductor 20 to the mid-terminal of the secondary winding 22 of a transformer 24, the primary windings 26 of which are connected across the line conductors 16 and 18, the other terminal of the armature winding 14 being connected by conductor 28 to the cathodes 30 and 32 of rectifier valves 34 and 36, respectively, and from the anodes 38 and 40 respectively of such valves through the windings 42 and 44, respectively, of a transformer 46 to the opposite ends of the secondary winding 22 of transformer 24.

In order to control the conductivity of the valves 34 and 36, the grids 48 and 50 thereof are connected through grid current limiting resistors 52 and 54, respectively, and windings 56 and 58, respectively, of a grid transformer 60, the primary winding 62 of which is connected through a phase shift circuit 64 to the secondary winding 66 of the transformer 24. The grid-cathode circuit for controlling the bias applied to grids 48 and 50 of valves 34 and 36 will be referred to hereinafter.

In order to provide a potential which can be employed for anti-hunt purposes, as will be described hereinafter, a resistor 68 is disposed having one terminal thereof connected through a capacitor 69 and rectifier valve 70 to the opposite ends of the winding 72 of transformer 46, the other terminal of the resistor 68 being connected through conductor 74 to the mid-terminal of the winding 72. Thus as the current flow through windings 42 and 44 of transformer 46 changes, a potential drop appears across resistor 68 that is a measure of the rate of change of such current.

As illustrated, a tachometer generator 76 is disposed to be driven by the motor 10, the tachometer being connected across a potentiometer resistor 78, whereby the potential drop across the potentiometer 78 is a direct measure of the speed of the motor 10.

In order to utilize the potential drop across the potentiometer 78 for controlling the conductivity of the rectifier valves 34 and 36 over a wide range of speed changes, amplifying vacuum valves 80 and 82 are connected in circuit relation therewith disposed for a predetermined operation. The valves 80 and 82 are similar, having anodes 84 and 86, respectively, cathodes 88 and 90, respectively, and control grids 92 and 94, respectively.

Each of valves 80 and 82 may have identical operating characteristics as illustrated in Fig. 2 by curve 96. Curve 96 represents the plate current of the valves when a load resistor is in the anode circuit as the grid voltage varies from a negative value to a positive value and illustrates that for a range of change of negative grid voltage, the change in the plate current follows a straight line, whereas if the grid voltage increases to a predetermined positive value, the plate current reaches a maximum.

As illustrated, the anode 84 of valve 80 is connected through an adjustable resistor 98 to one terminal of a source of energy, such as the battery 100, the cathode 88 of valve 80 being connected by conductor 102 through a resistor 104 and conductor 106 to the other terminal of the battery 100. The resistor 98 can be adjusted for controlling or limiting the flow of current in the anode-cathode circuit of the valve 80.

The grid-cathode circuit of valve 80 extends from the grid 92 through resistor 108, the adjustable tap 110 of potentiometer resistor 78, a section of the potentiometer resistor 78 and conductors 112 and 102 to the cathode 88. The resistor 108 is connected across a battery 114 whereby the potential drop across resistor 108 is of such a polarity as to apply a definite negative bias to the grid 92 whereas the potential across the section of the potentiometer resistor 78 connected in the grid-cathode circuit is of such polarity as to cooperate in the circuit to tend to render the grid bias less negative or more positive. Since the negative potential impressed on the grid 92 by reason of the resistor 108 is substantially constant, it is apparent that the conductivity of valve 80 is controlled in accordance with the potential across the section of the potentiometer resistor 78, which potential is a measure of, and is dependent upon, the speed of the motor 10.

The conductivity of valve 82 is dependent upon the conductivity of valve 80 and the potential drop across the potentiometer resistor 78. Thus the grid-cathode circuit of valve 82 extends from the grid 94 through the grid current limiting resistor 116, conductor 118, the potentiometer resistor 78, conductor 112, resistor 104, conductor 106, a section of a potentiometer resistor 120 which is connected across the battery 100, adjustable tap 121 thereof, conductor 122, a section of the anti-hunt resistor 68 and conductor 124 to the cathode 90 of valve 82. The voltage across the section of potentiometer resistor 120 can be considered as a negative reference voltage and is so adjusted as by means of the adjustable tap 121 as to be sufficiently large to maintain the grid bias of valve 82 negative when the valve 80 is conducting maximum current and the drop across the potentiometer resistor 78 is a maximum.

The anode-cathode circuit for valve 82 extends from the anode 86 through conductor 126, resistor 128, conductor 130, battery 132 and conductor 124 to the cathode 90 of valve 82. A potentiometer resistor 134 having an adjustable tap 136 is connected across the battery 132. The conductivity of valve 82 therefore determines the potential drop across resistor 128 and this drop cooperating with the drop across a section of potentiometer resistor 134 is employed as a negative bias for controlling the conductivity of the power rectifier valves 34 and 36 referred to hereinbefore.

In order to control the operation of the rectifier valves 34 and 36, the resistor 128 is connected in the grid-cathode circuits thereof, such circuits extending from the common tap between the secondary windings 56 and 58 of the grid transformer 60, through conductor 126, resistor 128, conductor 130, a section of the potentiometer resistor 134, adjustable tap 136 and conductor 137 to the cathodes 30 and 32 of valves 34 and 36.

In operation, the potentiometer resistor 120 is adjusted to control the negative bias applied therefrom to the grid 94 of the valve 82 to control the conductivity thereof and consequently control the potential drop across the resistor 128. As the bias of the grids 48 and 50 of the electric discharge valves 34 and 36 depends upon the alternating-current potential normally supplied thereto through the grid transformer 60, the phase shifter 64 and transformer 24 from the source of alternating current represented by conductors 16 and 18, and a direct-current biasing potential, which in this case is a measure of the potential drop across resistor 128, it is readily appreciated that the conductivity of the rectifier valves 34 and 36 is controlled by the drop across the resistor 128. As the bias of rectifier valves 34 and 36 is thus controlled, the flow of current therethrough and consequently through the armature winding 14 of the motor 10 is controlled to control or establish the speed of the motor 10.

Assuming that the motor 10 is operating at a predetermined speed then the tachometer generator 76 is also operated to produce a potential drop across the potentiometer resistor 78 that is a measure of the speed of motor 10. Assuming that the adjustable taps 78, 121 and 136 of each of the potentiometer resistors 78, 120 and 134, respectively, are adjusted to maintain the conditions of the system to maintain the predetermined speed of the motor 10, then each of valves 80 and 82 are operating depending upon the potential drop across potentiometer resistor 78. Thus, the bias of the grid 92 of valve 80 is composed of the negative bias of resistor 108 and the positive potential appearing across a section of potentiometer resistor 78 determined by the setting of the adjustable tap 110 so that the valve 80 is operating at a predetermined point along its characteristic curve 96 shown in Fig. 2.

At the same time, the valve 82 is also operating at a predetermined point along the characteristic curve 96 determined by the bias applied to the grid 94. As explained hereinbefore, the bias of the grid 94 is dependent upon the potential drop across the entire potentiometer resistor 78, the potential drop across resistor 104 and the negative bias determined by the setting of the adjustable tap 121 of the potentiometer resistor 120. In accordance with this invention, the tap 121 is so set that the negative bias thereof applied to the grid 94 is sufficient under all operating conditions of the motor 10 to maintain the grid bias negative whereby the valve 82 operates at some point between points 140 and 144 of the characteristic curve 96 as the valve 80 operates between points 138 and 142 or up to maximum plate current on the characteristic curve 96, and thereafter the valve 82 operates between points 140 and 144 depending entirely upon changes in the potential drop across potentiometer resistor 78 after the plate current of valve 80 reaches a maximum.

If for any reason the speed of the motor 10 should increase above the predetermined value to be maintained, then the tachometer generator 76 is operated by the motor 10 to effect an increase in the potential drop across the potentiometer resistor 78. This effects an increase in the positive bias impressed by the section of the potentiometer resistor 78 on the grid 92 of the valve 80 with the result that the grid bias thereof is rendered less negative and the valve 80 becomes more conducting. As the flow of current in the anode-cathode circuit of valve 80 increases, the potential drop across resistor 104 occasioned by such increase in the conductivity of valve 80 also increases.

The potential drop across resistor 104 cooperates with the potential drop across the potentiometer resistor 78, both being of the same polarity, in opposition to the negative bias impressed by the potential across the section of potentiometer resistor 120, all of which are in the grid-cathode circuit of valve 82, to render the grid 94 thereof less negative, whereby the valve 82 becomes more conducting to pass more current through its anode-cathode circuit including the resistor 128.

As the current flowing through resistor 128 is increased, the direct-current biasing potential applied to the grids of valves 34 and 36 and which is composed of the opposed potential drops across resistor 128 and the section of the potentiometer resistor 134 connected in the grid-cathode circuits thereof, becomes more negative. As the direct-current biasing potential becomes more negative, the resultant grid-cathode potential of the rectifier valves 34 and 36 is so changed that the resultant grid-cathode potential rises above the critical potential of the valves later in the half-period, and the rectifier valves 34 and 36 become alternately conducting later in the half cycle with the result that the average current conducted becomes less. Thus, as the biasing potential of rectifier valves 34 and 36 becomes more negative, less current flows through the armature windings 14 of the motor 10 to effectively decrease the speed of the motor 10 to the predetermined value which is to be maintained.

As the speed of the motor 10 approaches the predetermined value, it is apparent that the biasing potentials of the valves 80 and 82 are changed in accordance with the output of the tachometer generator 76 as measured across the potentiometer resistor 78. Thus, as the speed of the motor 10 is decreased, the potential drop across the section of the potentiometer resistor 78 in the grid-cathode circuit of valve 80 is decreased as well as the potential drop across the entire potentiometer resistor 78 in the grid-cathode circuit of the valve 82. The grid bias of valve 80 thus becomes more negative to effectively reduce the current flow through the valve 80 and consequently through the resistor 104. As the current through resistor 104 is thus reduced, the grid bias of valve 82 becomes more negative to reduce the flow of current therethrough and therefore effect a decrease in the potential drop across resistor 128 in the anode-cathode circuit of valve 82. When the potential across resistor 128 is thus reduced, the direct-current biasing potential in the grid-cathode circuits of the rectifier valves 34 and 36 becomes less negative with the result that more current is alternately conducted by the rectifier valves 34 and 36, thereby controlling the current flow through the armature windings 14 of the motor 10 to prevent an overrun of the predetermined speed which is to be maintained.

As will be apparent, if for any reason the speed of the motor 10 should decrease below the predetermined value, the same operation of the system to increase the flow of current through the armature windings 14 as just described will be effected to increase the speed of the motor.

Whether the operation of the system is to increase or decrease the speed of the motor 10 to return the speed to the predetermined value which is to be maintaind, it is found that the section of the resistor 68 connected in the grid-cathode circuit of valve 82 is effective in anticipating the corrective action or rate of change of the current flow in the armature winding circuit of motor 10 to prevent overcorrection in the operation of the motor. This is apparent when it is considered that the potential drop across resistor 68 is dependent upon the current flow therethrough as supplied by the valve 70 from the windings 72 of the transformer 46 depending upon the direction and rate of change of the current flowing in the windings 42 and 44 thereof from the rectifier valves 34 and 36.

In practice it is found that the system of this invention functions efficiently as a wide range regulating system which has a high system gain at low speeds or voltages and an appropriately lower gain at high speeds or voltages. This is because of the cooperation of the valves 80 and 82 in response to the output of the tachometer generator 76 and of the operation of the valve 80 with its high amplification characteristics in response to changes in the lower speed or voltage zone and the consequential control of the operation of valve 82 whereas at the high speed or voltage zone when the valve 80 is operating at maximum conductivity and zero gain, the operation of valve 82 is dependent only upon a change in the signal voltage as supplied by the tachometer generator 76. As is apparent where the valve 82 operates along its characteristic curve 96 between points 140 and 144, the system gain at the higher speed of the motor is considerably lower than when the system is operating in response to low speeds with the valve 80 amplifying up to its maximum as the grid bias thereof changes.

The system is efficient and stable in operation. It can be readily reproduced as the components thereof are of standard construction and are available to the trade.

I claim as my invention:

1. In a regulating system, the combination comprising, a dynamoelectric machine disposed for operation to maintain a given characteristic substantially constant, control means disposed for operation to control the operation of the machine, means responsive to said given characteristic for providing a source of voltage dependent thereon, a vacuum valve disposed to be rendered conducting over the range of zero plate current to maximum steady state plate current in accordance with a measure of said source of voltage over a predetermined range thereof, a resistor in the output circuit of the vacuum valve, another vacuum valve having an anode and cathode connected to impress a voltage on the control means to control the operation of the machine, a control grid for said another valve, and means, including the source of voltage that is dependent upon the given characteristic and the resistor, connected in the grid-cathode circuit of said another valve for controlling the conductivity of said another valve and consequently the voltage impressed on the control means.

2. In a regulating system, the combination comprising, a dynamoelectric machine disposed for operation to maintain a given characteristic substantially constant, control means disposed for operation to control the operation of the machine, means responsive to said given characteristic for providing a source of voltage dependent thereon, a vacuum valve disposed to be rendered conducting over the range of zero plate current to maximum steady state plate current in accordance with a measure of said source of voltage over a predetermined range thereof, a resistor in the output circuit of the vacuum valve, another vacuum valve having an anode and cathode connected to impress a voltage on the control means to control the operation of the machine, a control grid for said another valve, a source of voltage for applying a negative bias to the control grid, the grid-cathode circuit of said another valve including the negative voltage source, the source of voltage dependent upon the given characteristic and the resistor, the negative voltage source being sufficiently large to maintain a negative bias on the grid of said another valve when the voltage across the resistor is a maximum to maintain operation of said another valve along the straight line portion of its plate current characteristic curve and thereby control the voltage impressed on the control means.

3. In a regulating system, the combination comprising, a dynamoelectric machine disposed for operation to maintain a given characteristic substantially constant, control means disposed for operation to control the operation of the machine, means responsive to said given characteristic for providing a source of voltage dependent thereon, a vacuum valve disposed to be rendered conducting over the range of zero plate current to maximum steady state plate current in accordance with a measure of said source of voltage over a predetermined range thereof, a resistor in the output circuit of the vacuum valve, another vacuum valve having an anode and cathode connected to impress a voltage on the control means to control the operation of the machine, a control grid for said another valve, a source of voltage for applying a negative bias to the control grid, the grid-cathode circuit of said another valve including the negative voltage source, the source of voltage dependent upon the given characteristic and the voltage drop across the resistor connected in the output circuit of the first vacuum valve, the negative voltage source being sufficiently large to maintain a negative bias on the grid of said another valve when the voltage across the resistor is a maximum to maintain operation of said another valve along the straight line portion of its plate current characteristic curve in response to a further increase of the voltage dependent upon the given characteristic to thereby control the voltage impressed on the control means.

4. In a regulating system, the combination comprising, a dynamoelectric machine disposed for operation to maintain a given characteristic substantially constant, control means disposed for operation to control the operation of the machine, means responsive to said given characteristic for providing a source of voltage dependent thereon, a vacuum valve disposed to be rendered conducting over the range of zero plate current to maximum steady state plate current in accordance with a measure of said source of voltage over a predetermined range thereof, an anode-cathode output circuit for the vacuum valve, a resistor in said output circuit, adjustable means in said output circuit for controlling the maximum flow of current through the resistor and consequently the maximum voltage drop thereacross, another vacuum valve having an anode and cathode connected to impress a voltage of predetermined polarity on the control means to control the operation of the machine, a control grid for said another valve, a source of voltage for applying a negative bias to the control grid, the grid-cathode circuit of said another valve including the negative voltage source, the source of voltage dependent upon the given characteristic and the voltage across the resistor, the negative voltage source being sufficiently large to maintain a negative bias on the grid of said another valve when the voltage across the resistor is a maximum to maintain operation of said another valve along the straight line portion of its plate current characteristic curve in response to a further increase of the voltage dependent upon the given characteristic to thereby control the voltage of predetermined polarity impressed on the control means.

5. In a regulating system, the combination comprising, a dynamoelectric machine disposed for operation to maintain a given characteristic substantially constant, grid controlled valve means disposed for operation to control the operation of the machine, means responsive to said given characteristic for providing a source of voltage dependent thereon, a vacuum valve disposed to be rendered conducting over the range of zero plate current to maximum steady state plate current in accordance with a measure of said source of voltage over a predetermined range thereof, an anode-cathode output circuit for the vacuum valve including a resistor having a voltage drop thereacross dependent upon the conductivity of the valve, another vacuum valve having an anode-cathode output circuit interconnected with the grid controlled valve means to impress a bias thereon for controlling the operation of the valve means, a control grid for said another valve, a source of negative bias for the control grid, the grid-cathode circuit of said another valve including the source of negative bias, the source of voltage dependent upon the given characteristic and the voltage drop across the resistor, the source of negative bias being sufficient to maintain a negative bias on the grid of said another valve when the voltage across the resistor is a maximum to maintain operation of said another valve along the straight line portion of its plate current characteristic curve in response to further increase of the voltage dependent upon the given characteristic to thereby control the bias impressed on the control valve means.

6. In a regulating system, the combination comprising, a dynamoelectric machine disposed for operation to maintain a given characteristic substantially constant, control means disposed for operation to control the operation of the machine, means responsive to said given characteristic for providing a source of voltage dependent thereon, a vacuum valve disposed to be rendered conducting over the range of zero plate current to maximum steady state plate current in accordance with a measure of said source of voltage over a predetermined range thereof, a resistor in the output circuit of the vacuum valve, another vacuum valve having an anode and cathode connected to impress a voltage on the control means to control the operation of the machine, a control grid for said another valve, a source of voltage for applying a negative bias to the control grid, the grid-cathode circuit of said another valve including the negative voltage source, the source of voltage dependent upon the given characteristic and the resistor, the negative voltage source being sufficiently large to maintain a negative bias on the grid of said another valve when the voltage across the resistor is a maximum to maintain operation of said another valve along the straight line portion of its plate current characteristic curve and thereby control the voltage impressed on the control means, and means responsive to the rate of change in the operation of the control means and connected in circuit relation with the grid-cathode circuit of said another valve for stabilizing the operation thereof to prevent hunting.

7. In a regulating system, the combination comprising, a dynamoelectric machine disposed for operation to maintain a given characteristic substantially constant, grid controlled valve means disposed for operation to control the operation of the machine, means responsive to said given characteristic for providing a source of voltage dependent thereon, a vacuum valve disposed to be rendered conducting over the range of zero plate current to maximum steady state plate current in accordance with a measure of said source of voltage over a predetermined range thereof, an anode-cathode output circuit for the vacuum valve including a resistor having a voltage drop thereacross dependent upon the conductivity of the valve, another vacuum valve having an anode-cathode output circuit interconnected with the grid controlled valve means to impress a bias thereon for controlling the operation of the valve means, a control grid for said another valve, a source of negative bias for the control grid, the grid-cathode circuit of said another valve including the source of negative bias, the source of voltage dependent upon the given characteristic and the voltage drop across the resistor, the source of negative bias being sufficient to maintain a negative bias on the grid of said another valve when the voltage across the resistor is a maximum to maintain operation of said another valve along the straight line portion of its plate current characteristic curve in response to further increase of the voltage dependent upon the given characteristic to thereby control the bias impressed on the control valve means, and means responsive to the rate of change in the operation of the control valve means and connected in circuit relation with the grid-cathode circuit of said another valve for stabilizing the operation thereof to prevent hunting.

8. In a system for regulating the speed of a dynamoelectric machine having an armature winding disposed to be supplied through a pair of alternately conducting grid-controlled electric valves, the combination comprising, a tachometer generator disposed for operation in accordance with the speed of the machine for providing a source of voltage that is a measure of the speed of the machine, a vacuum valve disposed to be rendered conducting over the range of zero plate current to maximum steady state plate current in accordance with a measure of the source of voltage over a predetermined range thereof, an anode-cathode output circuit for the vacuum valve including a resistor having a voltage drop thereacross dependent upon the conductivity of the valve, another vacuum valve having an anode-cathode output circuit interconnected with the grids of the grid-controlled valves to impress a bias thereon to control the conductivity thereof, a control grid for said another valve, a source of negative bias for the control grid, means for adjusting the negative bias, the grid-cathode circuit of said another valve including the source of negative bias, the source of voltage that is a measure of the speed of the machine and the voltage drop across the resistor, the negative bias being sufficient to maintain a negative bias on the grid of said another valve when the voltage across the resistor is a maximum to maintain operation of said another valve along the straight line portion of its plate current characteristic curve in response to a further increase of the voltage that is a measure of the speed of the machine to thereby control the bias impressed on the grids of the grid-controlled electric valves.

9. In a system for regulating the speed of a dynamoelectric machine having an armature winding disposed to be supplied through a pair of alternately conducting grid-controlled electric valves, the combination comprising, a tachometer generator disposed for operation in accordance with the speed of the machine for providing a source of voltage that is a measure of the speed of the machine, a vacuum valve disposed to be rendered conducting over the range of zero plate current to maximum steady state plate current in accordance with a measure of the source of voltage over a predetermined range thereof, an anode-cathode output circuit for the vacuum valve including a resistor having a voltage drop thereacross dependent upon the conductivity of the valve, another vacuum valve having an anode-cathode output circuit interconnected with the grids of the grid-controlled valves to impress a bias thereon to control the conductivity thereof, a control grid for said another valve, a source of negative bias for the control grid, means for adjusting the negative bias, the grid-cathode circuit of said another valve including the source of negative bias, the source of voltage that is a measure of the speed of the machine and the voltage drop across the resistor, the negative bias being sufficient to maintain a negative bias on the grid of said another valve when the voltage across the resistor is a maximum to maintain operation of said another valve along the straight line portion of its plate current characteristic curve in response to a further increase of the voltage that is a measure of the speed of the machine to thereby control the bias impressed on the grids of the grid-controlled electric valves, and means responsive to the rate of change of the conductivity of the grid-controlled electric valves connected in circuit relation with the grid-cathode circuit of said another valve for stabilizing the operation thereof to prevent hunting.

10. In a regulating system, the combination comprising, a dynamoelectric machine disposed for operation to maintain a given characteristic substantially constant, control means disposed for operation to control the operation of the machine, means responsive to said given characteristic for providing a source of voltage dependent thereon, a vacuum valve disposed to be rendered conducting over the range of zero plate current to maximum steady state plate current in accordance with a measure of said source of voltage over a predetermined range thereof, a resistor in the output circuit of the vacuum valve, another vacuum valve having an anode and cathode connected to impress a voltage on the control means to control the operation of the machine, a control grid for said another valve, means, including the source of voltage that is dependent upon the given characteristic and the resistor, connected in the grid-cathode circuit of said another valve for controlling the conductivity of said another valve and consequently the voltage impressed on the control means, and means responsive to the rate of change in the operation of the control means and connected in circuit relation with the grid-cathode circuit of said another valve for stabilizing the operation thereof to prevent hunting.

DONALD F. ALDRICH.

No references cited.